US012587064B2

(12) United States Patent (10) Patent No.: US 12,587,064 B2
Irino et al. (45) Date of Patent: Mar. 24, 2026

(54) ELECTRIC MOTOR SYSTEM, TURBO COMPRESSOR, AND REFRIGERATION DEVICE

(71) Applicant: DAIKIN INDUSTRIES, LTD., Osaka (JP)

(72) Inventors: Yusuke Irino, Osaka (JP); Yuu Fu, Osaka (JP); Yuji Nakazawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 210 days.

(21) Appl. No.: 18/369,519

(22) Filed: Sep. 18, 2023

(65) Prior Publication Data

US 2024/0006958 A1 Jan. 4, 2024

Related U.S. Application Data

(63) Continuation of application No. PCT/JP2022/011929, filed on Mar. 16, 2022.

(30) Foreign Application Priority Data

Mar. 22, 2021 (JP) ................................. 2021-047476

(51) Int. Cl.
*H02K 7/09* (2006.01)
*F16C 32/04* (2006.01)
*F25B 31/02* (2006.01)

(52) U.S. Cl.
CPC ........... *H02K 7/09* (2013.01); *F16C 32/0485* (2013.01); *F16C 32/0489* (2013.01); *F25B 31/026* (2013.01)

(58) Field of Classification Search
CPC ........ H02K 7/09; H02K 3/28; H02K 2205/03; H02K 7/14; F25B 31/026; F04D 25/0606;
(Continued)

(56) References Cited

U.S. PATENT DOCUMENTS 4,523,896 A * 6/1985 Lhenry ................. F04D 29/058
417/244
6,450,780 B1 * 9/2002 Larjola ................. F04D 29/057
417/365
(Continued)

FOREIGN PATENT DOCUMENTS

CN 1713490 A 12/2005
CN 211239475 U 8/2020
(Continued)

OTHER PUBLICATIONS

International Preliminary Report of corresponding PCT Application No. PCT/JP2022/011929 dated Oct. 5, 2023.
(Continued)

*Primary Examiner* — Ahmed Elnakib
(74) *Attorney, Agent, or Firm* — Spencer Fane LLP

(57) ABSTRACT

An electric motor system includes a drive shaft configured to rotationally drive a load, a bearingless motor and a radial magnetic bearing arranged side by side in an axial direction of the drive shaft, and a thrust magnetic bearing disposed between the bearingless motor and the radial magnetic bearing. A radial load on the drive shaft is supported in a non-contact manner by the bearingless motor and the radial magnetic bearing.

16 Claims, 7 Drawing Sheets

(58) Field of Classification Search
CPC ...... F04D 17/10; F04D 29/051; F04D 29/058;
F16C 32/0487; F16C 32/0493; F16C
39/06; F16C 2362/52; F16C 2380/26;
F16C 32/0485; F16C 32/0489
USPC ........................................................ 310/90.5
See application file for complete search history.

(56) References Cited

U.S. PATENT DOCUMENTS

2012/0306305 A1* 12/2012 Filatov ..................... H02K 7/09
310/90.5
2015/0275911 A1* 10/2015 Carrasco ................. F04D 25/06
417/423.12
2020/0350804 A1* 11/2020 Ono ......................... H02K 3/28

2021/0062715 A1* 3/2021 Jin ............................ F02C 9/00

FOREIGN PATENT DOCUMENTS

| JP | 7-184345 A | 7/1995 |
| JP | 2013-231471 A | 11/2013 |
| JP | 2013231471 | * 11/2013 |
| WO | 99/31390 A1 | 6/1999 |

OTHER PUBLICATIONS

International Search Report of corresponding PCT Application No. PCT/JP2022/011929 dated May 17, 2022.
European Search Report of corresponding EP Application No. 22 77 5331.6 dated Feb. 7, 2025.

* cited by examiner

ELECTRIC MOTOR SYSTEM, TURBO COMPRESSOR, AND REFRIGERATION DEVICE

CROSS-REFERENCE TO RELATED APPLICATIONS

This is a continuation of International No. PCT/JP2022/011929 filed on Mar. 16, 2022, which claims priority to Japanese Patent Application No. 2021-047476, filed on Mar. 22, 2021. The entire disclosures of these applications are incorporated by reference herein.

BACKGROUND

Technical Field

The present disclosure relates to an electric motor system, a turbo compressor, and a refrigeration apparatus.

Background Art

An electric motor system that has been known in the art includes a drive shaft configured to rotationally drive a load, and an electric motor (motor) configured to rotationally drive the drive shaft. The electric motor system is used in, for example, a turbo compressor including an impeller as a load. A known electric motor system includes two radial magnetic bearings that support a radial load on the drive shaft in a non-contact manner by electromagnetic force. The two radial magnetic bearings are arranged one on each side of the motor.

In recent years, to simplify the structure of an electric motor system, a bearingless motor defined as a "motor magnetically integrated with the magnetic bearing function" has been used (e.g., Japanese Unexamined Patent Publication No. H07-184345). An electric motor system (motor apparatus) of Japanese Unexamined Patent Publication No. H07-184345 includes one bearingless motor and one radial magnetic bearing, which support a radial load on a drive shaft.

SUMMARY

A first aspect of the present disclosure is directed to an electric motor system including a drive shaft configured to rotationally drive a load, a bearingless motor and a radial magnetic bearing arranged side by side in an axial direction of the drive shaft, and a thrust magnetic bearing disposed between the bearingless motor and the radial magnetic bearing. A radial load on the drive shaft is supported in a non-contact manner by the bearingless motor and the radial magnetic bearing.

DETAILED DESCRIPTION OF EMBODIMENT(S)

Embodiments will be described below with reference to the drawings. The embodiments below are merely exemplary ones in nature, and are not intended to limit the scope, applications, or use of the invention.

First Embodiment

Configurations of Turbo Compressor and Electric Motor System

Figure 1:
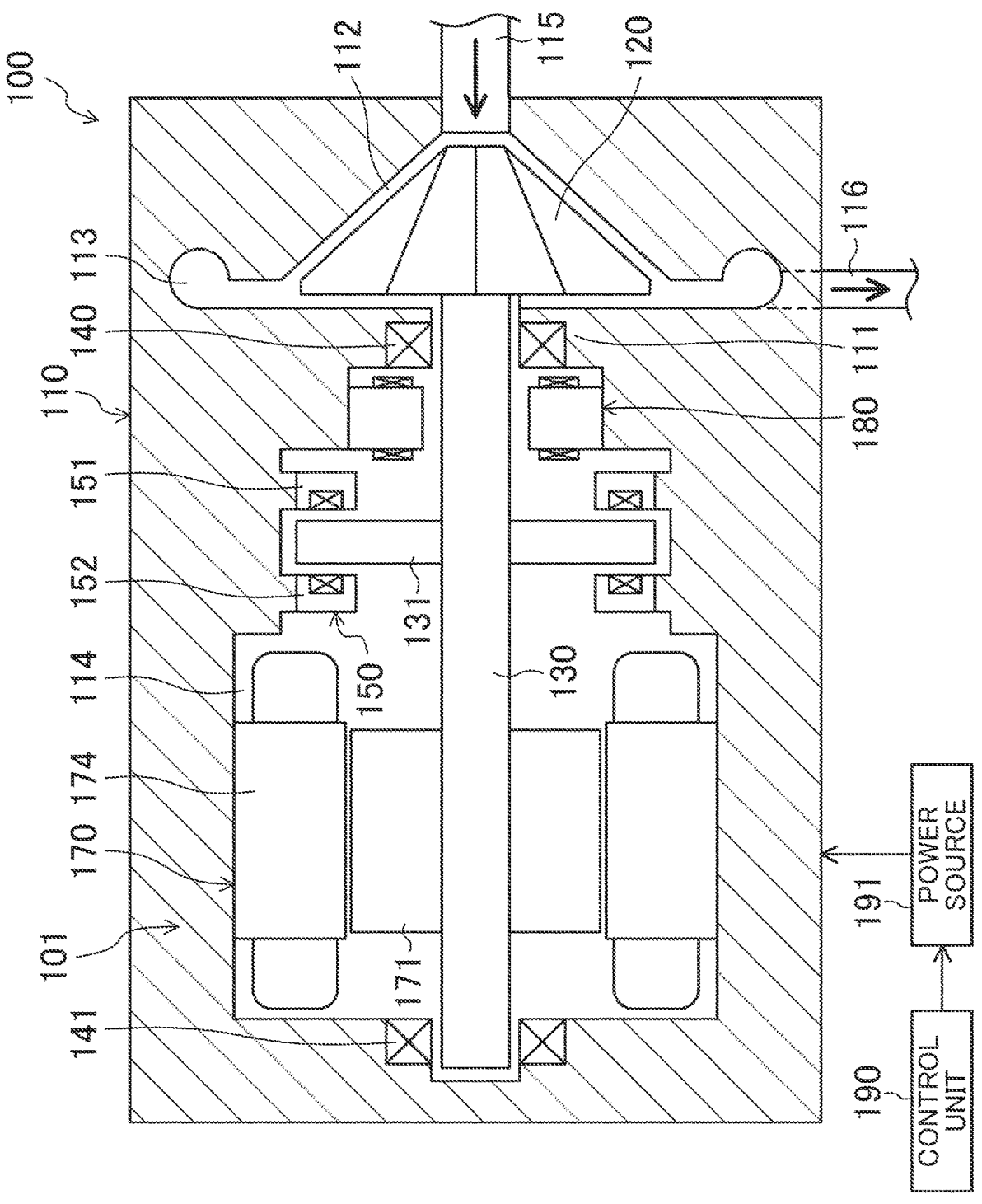
FIG. 1 is a front view illustrating example configurations of an electric motor system and a turbo compressor according to a first embodiment.

A turbo compressor (100) of this embodiment is provided in, for example, a refrigerant circuit that performs a refrigeration cycle to compress a refrigerant. As illustrated in FIG. 1, the turbo compressor (100) includes a casing (110), an impeller (120), a drive shaft (130), touchdown bearings (140, 141), a thrust magnetic bearing (150), a bearingless motor (170), a radial magnetic bearing (180), a control unit (190), and a power source (191). Here, the drive shaft (130), the thrust magnetic bearing (150), the bearingless motor (170), and the radial magnetic bearing (180) mainly constitute an electric motor system (101) of this embodiment. In the electric motor system (101), the impeller (120) constitutes a load. However, the type of the load on the electric motor system (101) is not limited to the impeller (120).

In this embodiment, an "axial direction" refers to a direction of an axis, i.e., a direction of an axial center of the drive shaft (130), and a "radial direction" refers to a direction orthogonal to the axial direction of the drive shaft (130). An "outer circumferential side" of a component is a side farther from the axial center of the drive shaft (130), while an "inner circumferential side" refers to a side closer to the axial center of the drive shaft (130).

In the electric motor system (101), the bearingless motor (170) and the radial magnetic bearing (180) are arranged side by side in the axial direction of the drive shaft (130). The radial load on the drive shaft (130) is supported in a non-contact manner by the bearingless motor (170) and the radial magnetic bearing (180).

Casing

The casing (110) is formed into a cylindrical shape with its both ends closed, and is arranged such that the axis of the cylindrical shape extends horizontally. Space in the casing (110) is divided by a wall portion (111) into an impeller chamber (112) and an electric motor chamber (114). The impeller chamber (112) houses the impeller (120). The electric motor chamber (114) mainly houses the thrust magnetic bearing (150), the bearingless motor (170), and the radial magnetic bearing (180). The drive shaft (130) extends through the casing (110) in the axial direction to couple the impeller (120) and the bearingless motor (170) together. The bearingless motor (170) and the radial magnetic bearing (180) constitute a drive support.

In this embodiment, the radial magnetic bearing (180) is disposed in a portion of the electric motor chamber (114) closer to the impeller (120), and the bearingless motor (170) is disposed in a portion of the electric motor chamber (114) farther from the impeller (120). That is to say, the radial magnetic bearing (180) is disposed between the bearingless motor (170) and the impeller (120). Note that the bearingless motor (170) may be disposed in a portion of the electric motor chamber (114) closer to the impeller (120), and the radial magnetic bearing (180) may be disposed in a portion of the electric motor chamber (114) farther from the impeller (120). That is to say, the bearingless motor (170) may be disposed between the radial magnetic bearing (180) and the impeller (120).

Impeller

The impeller (120) has a plurality of blades to have a substantially conical outer shape. The impeller (120) is housed in the impeller chamber (112) while being fixed to one end of the drive shaft (130). The impeller chamber (112) is connected to an inlet (115) and an outlet (116), and has an outer circumferential portion that forms a compression space (113). The inlet (115) is intended to guide the refrigerant from the outside into the impeller chamber (112). The outlet (116) is intended to return the high-pressure refrigerant compressed in the impeller chamber (112) to the outside. The outlet (116) is on the high-pressure side of the impeller (120), and the inlet (115) is on the low-pressure side of the impeller (120). Thus, refrigerant force proportional to the pressure differential is generated toward the inlet (115) in the axial direction. The compression space (113) is formed into a spiral shape, which may cause a pressure imbalance depending on the operating conditions. Thus, the refrigerant force is generated in the radial direction.

Touchdown Bearing

The turbo compressor (100) is provided with the two touchdown bearings (140, 141). One of the touchdown bearings (140) is provided near one end portion of the drive shaft (130) (an end portion near the impeller (120)), and the other touchdown bearing (141) is provided near the other end portion of the drive shaft (130). The touchdown bearings (140, 141) are configured to support the drive shaft (130) while the bearingless motor (170) and the radial magnetic bearing (180) are non-energized (i.e., while the drive shaft (130) is not levitated).

Note that, to increase the bearing span between the bearingless motor (170) and the radial magnetic bearing (180), the touchdown bearing (140) may be disposed between the thrust magnetic bearing (150) and the radial magnetic bearing (180).

Thrust Magnetic Bearing

In this embodiment, the thrust magnetic bearing (150) is disposed between the bearingless motor (170) and the radial magnetic bearing (180). The thrust magnetic bearing (150) is configured to apply a magnetic force to the drive shaft (130) bidirectionally along the axis of the drive shaft (130). Specifically, the thrust magnetic bearing (150) includes first and second electromagnets (151, 152), which are arranged one on each side of a disk portion (thrust disk) (131) of the drive shaft (130) in the axial direction. Thus, the thrust magnetic bearing (150) can support the disk portion (131) in a non-contact manner using electromagnetic force. The thrust magnetic bearing (150) controlling current that flows through the first and second electromagnets (151, 152) can control the position of the disk portion (131) (i.e., the drive shaft (130)) in the direction in which the first and second electromagnets (151, 152) face each other (i.e., the axial direction).

Bearingless Motor

The bearingless motor (170) is configured to rotationally drive the drive shaft (130) using electromagnetic force and to support the radial load on the drive shaft (130) in a non-contact manner. The bearingless motor (170) includes a rotor (171) and a stator (174). The rotor (171) is fixed to the drive shaft (130). The stator (174) is fixed to the inner circumferential wall of the casing (110).

Figure 2:
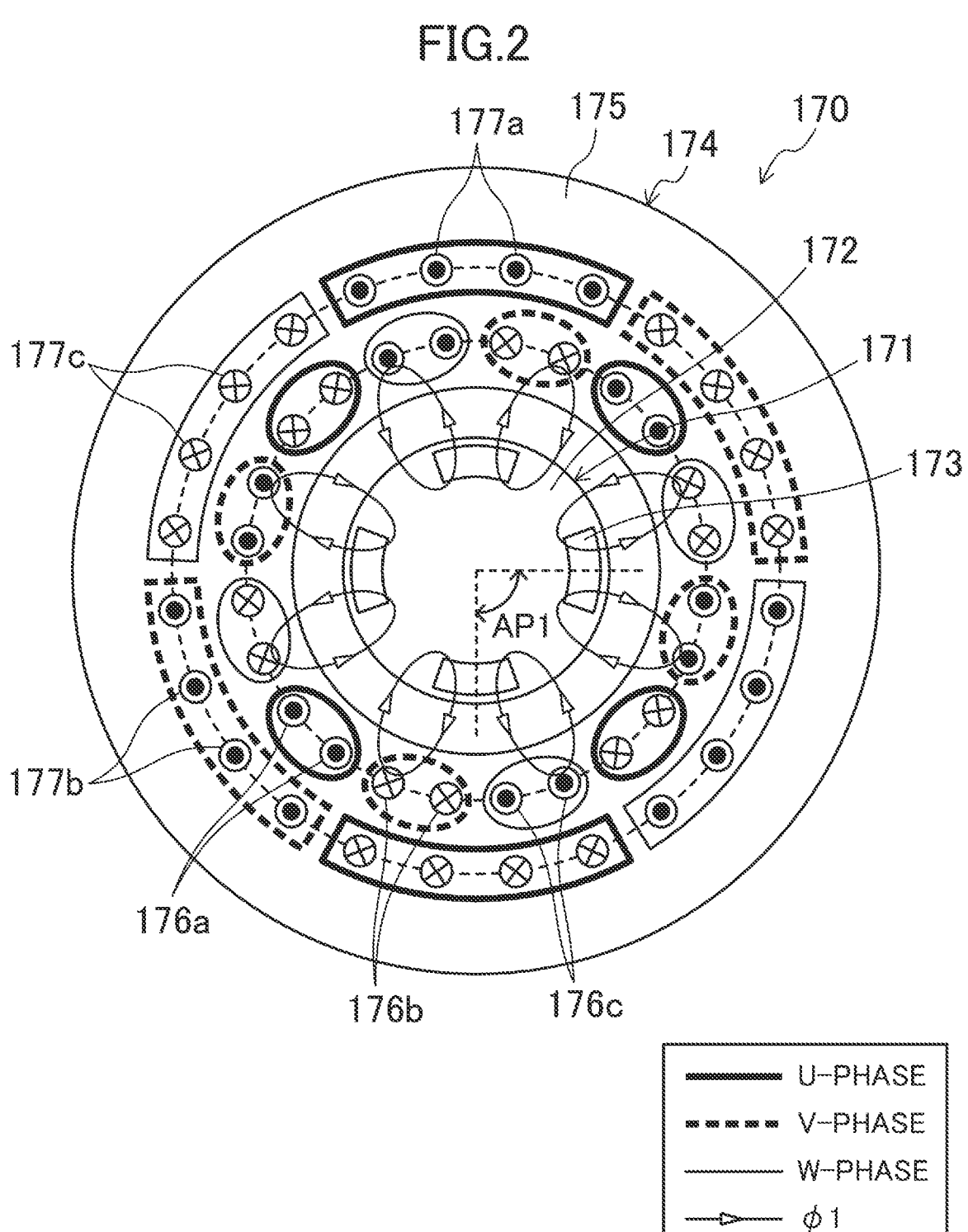
FIG. 2 is a transverse sectional view illustrating an example configuration of a bearingless motor of the electric motor system illustrated in FIG. 1.

As illustrated in FIG. 2, the bearingless motor (170) may be, for example, a consequent-pole bearingless motor. The bearingless motor (170) may be of another type, such as a brushless permanent magnet (BPM) type or a synchronous reluctance type. The stator (174) of the bearingless motor (170) has a back yoke (175), a plurality of teeth (not shown), and drive coils (176a to 176c) and support coils (177a to 177c) that are wound around the teeth. The rotor (171) of the bearingless motor (170) includes a core (172) and a plurality of permanent magnets (173) (four permanent magnets in this example) embedded in the core (172).

The stator (174) is made of a magnetic material (e.g., an electromagnetic steel sheet). The back yoke (175) of the stator (174) is formed in a cylindrical shape. The teeth of the stator (174) protrude radially inward of the back yoke (175). Each of the drive coils (176a to 176c) and the support coils (177a to 177c) is wound around a corresponding one of the teeth by a distributed winding method. Each of the drive coils (176a to 176c) and the support coils (177a to 177c) may be wound around a corresponding one of the teeth by a concentrated winding method.

Each drive coil (176a to 176c) is wound around a radially inner part of a corresponding one of the teeth. The drive coils (176a to 176c) may include a U-phase drive coil (176a) circled with a thick solid line, a V-phase drive coil (176b) circled with a thick broken line, and a W-phase drive coil (176c) circled with a thin solid line in FIG. 2.

Each support coil (177a to 177c) is wound around a radially outer part of a corresponding one of the teeth. The support coils (177a to 177c) may include a U-phase support coil (177a) circled with a thick solid line, a V-phase support coil (177b) circled with a thick broken line, and a W-phase support coil (177c) circled with a thin solid line in FIG. 2.

The core (172) of the rotor (171) is formed in a cylindrical shape. A shaft hole (not shown) for receiving the drive shaft (130) is formed in the center of the core (172). The core (172) is made of a magnetic material (e.g., an electromagnetic steel sheet). The four permanent magnets (173) having a shape that conforms to that of the outer circumferential surface of the core (172) are embedded in a portion of the core (172) near this outer circumferential surface at angular pitches (API) of 90° in the circumferential direction. The four permanent magnets (173) have the same shape. Each permanent magnet (173) has an N pole on its outer circumferential surface, and the core (172) between the permanent magnets (173) has a pseudo S pole on its outer circumferential surface. Each permanent magnet (173) may have an S pole on its outer circumferential surface.

The bearingless motor (170) generates a driving torque and a bearing force together by interactions among a magnet magnetic flux produced by each permanent magnet (173), a driving magnetic flux produced to rotationally drive the impeller (120) and the drive shaft (130), and a bearing magnetic flux produced to support the radial load on the drive shaft (130) in a non-contact manner. Here, the bearing force is obtained by creating an imbalance in the magnetic flux density in the gap between the rotor (171) and the stator (174). Thus, as the bearing force increases, the imbalance in the magnetic flux density in the gap grows. This increases the eddy-current loss in the core (172) of the rotor (171) or the permanent magnets (173) and the distal ends of the teeth of the stator (174) facing each other. As a result, the efficiency of the bearingless motor (170) decreases.

Radial Magnetic Bearing

The radial magnetic bearing (180) is configured to support the radial load on the drive shaft (130) in a non-contact manner. The radial magnetic bearing (180) is fixed to the inner circumferential wall of the casing (110).

Figure 3:
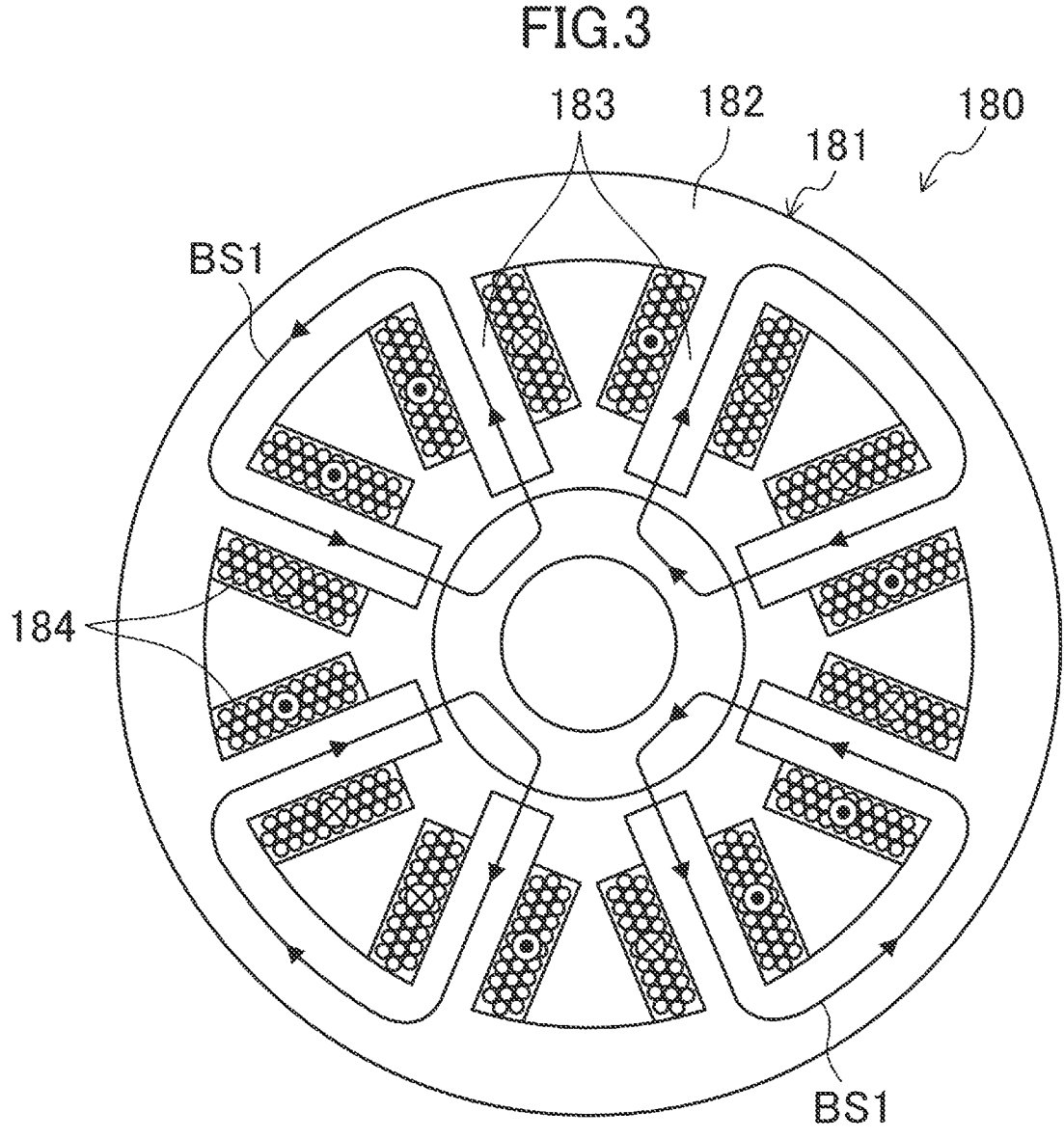
FIG. 3 is a transverse sectional view illustrating an example configuration of a radial magnetic bearing of the electric motor system illustrated in FIG. 1.

As illustrated in FIG. 3, the radial magnetic bearing (180) is, for example, a heteropolar radial magnetic bearing. The radial magnetic bearing (180) includes a stator (181) having a back yoke (182) and a plurality of teeth (183), and a plurality of coils (184), each of which is wound around a corresponding one of the teeth (183). The radial magnetic bearing (180) supports the radial load on the drive shaft (130) in a non-contact manner using an electromagnetic force generated by currents flowing from the power source (191) through the coils (184). The directions of the currents flowing through the coils (184) are set so that bearing magnetic fluxes BS1 are generated in the directions indicated by the arrows shown in FIG. 3.

In this embodiment, the magnetic flux supporting the radial load on the drive shaft (130) is the sum of the bearing magnetic fluxes BS1 of the radial magnetic bearing (180) and the bearing magnetic fluxes of the bearingless motor (170) described above.

In this embodiment, the radial magnetic bearing (180) is disposed between the bearingless motor (170) and the impeller (120). Alternatively, the radial magnetic bearing (180) may be disposed near one end of the drive shaft (130), and the impeller (120) may be disposed between the bearingless motor (170) and the radial magnetic bearing (180). However, the bearingless motor (170) receives less bearing load if the radial magnetic bearing (180) is disposed between the bearingless motor (170) and the impeller (120) as in this embodiment.

Control Unit

The control unit (190) outputs a command value for controlling the voltage to be supplied to the thrust magnetic bearing (150) or a command value for controlling the voltage to be supplied to each of the bearingless motor (170) and the radial magnetic bearing (180), based on a value detected by various sensors (not shown) and the target rotational speeds of the impeller (120) and the drive shaft (130), so that the drive shaft (130) is in an intended position. Examples of various sensors include a gap sensor capable of detecting the gap between the disk portion (131) and the thrust magnetic bearing (150), a gap sensor capable of detecting the gap between the stator (174) and the rotor (171) of the bearingless motor (170), and a gap sensor capable of detecting the gap between the drive shaft (130) and the radial magnetic bearing (180).

The control unit (190) may include a microcomputer (not shown) and programs for operating the microcomputer, for example.

Power Source

The power source (191) supplies a voltage to each of the thrust magnetic bearing (150), the bearingless motor (170), and the radial magnetic bearing (180), based on the command values from the control unit (190). For example, the power source (191) may be configured as a pulse width modulation (PWM) amplifier. The power source (191) constitutes an electric circuit.

Features of First Embodiment

The electric motor system (101) of this embodiment includes the drive shaft (130) that rotationally drives the impeller (120), and the bearingless motor (170) and the radial magnetic bearing (180) arranged side by side in the axial direction of the drive shaft (130). The radial load on the drive shaft (130) is supported in a non-contact manner by the bearingless motor (170) and the radial magnetic bearing (180).

According to this embodiment, the thrust magnetic bearing (150) is disposed between the bearingless motor (170) and the radial magnetic bearing (180). This makes it easier to provide a sufficient bearing span between the bearingless motor (170) and the radial magnetic bearing (180) even if the size of the electric motor system (101) is reduced. Thus, the load received by the bearingless motor (170) or the radial magnetic bearing (180) can be reduced. Thus, the efficiency with which the bearingless motor (170) rotationally drives the drive shaft (130) is less decreased due to the eddy-current loss. In addition, while the efficiency of the electric motor system (101) is kept from decreasing, the size of the electric motor system (101) can be reduced. This can reduce the size of the turbo compressor (100) including the electric motor system (101).

Figure 4:
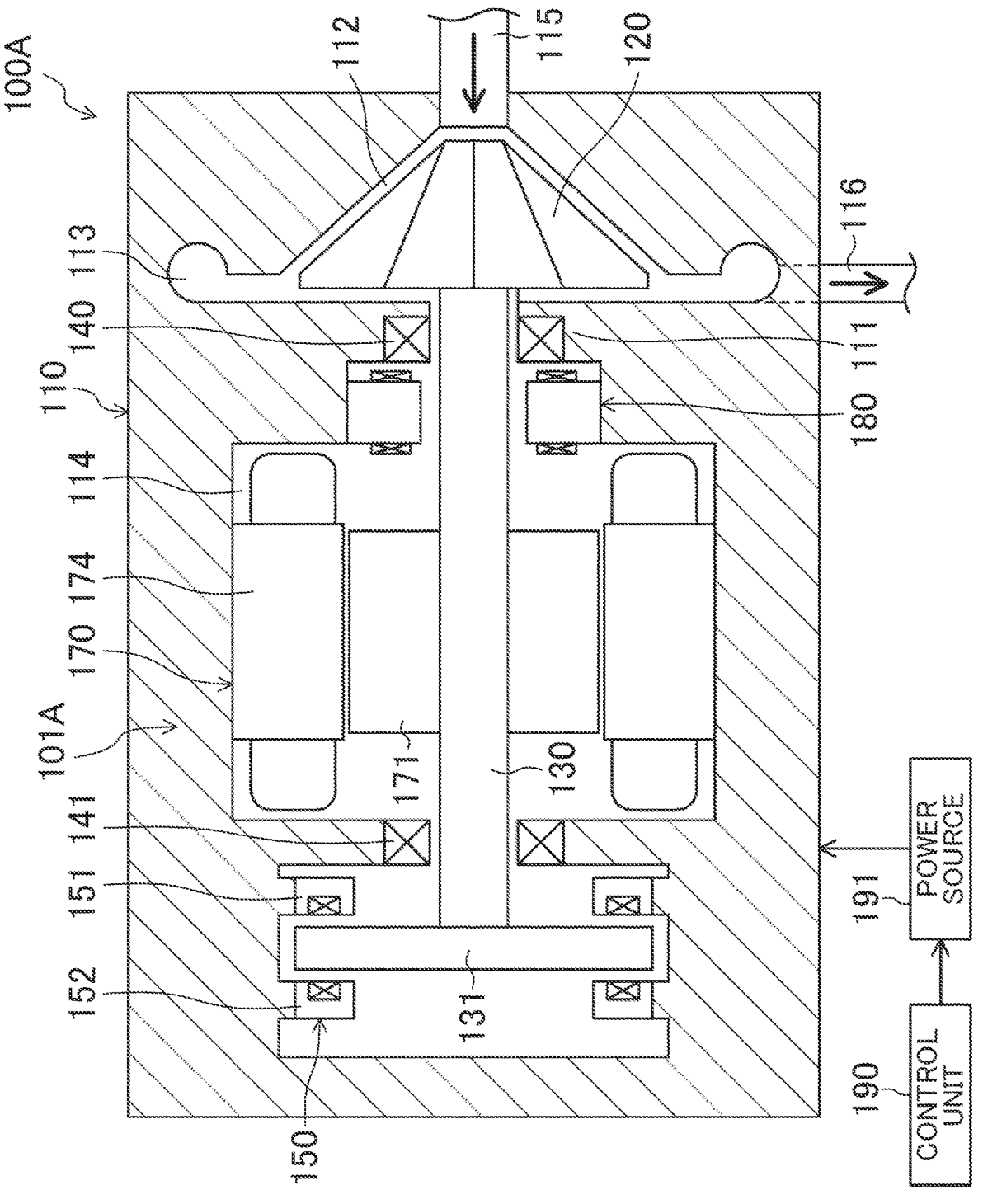
FIG. 4 is a front view illustrating example configurations of an electric motor system and a turbo compressor according to a comparative example.

FIG. 4 is a front view illustrating example configurations of an electric motor system (101A) and a turbo compressor (100A) according to a comparative example. It should be noted that, in FIG. 4, the same reference characters are used to designate the same elements as those of the electric motor system (101) and the turbo compressor (100) in this embodiment illustrated in FIG. 1.

The electric motor system (101A) and the turbo compressor (100A) of the comparative example illustrated in FIG. 4 are distinct from those of this embodiment in that the thrust magnetic bearing (150) is disposed on the other end portion of the drive shaft (130) (an end portion farther from the one end portion to which the impeller (120) is fixed). In other words, the thrust magnetic bearing (150) is not disposed between the bearingless motor (170) and the radial magnetic bearing (180). Thus, the bearing span between the bearingless motor (170) and the radial magnetic bearing (180) of the electric motor system (101A) of the comparative example is shorter than that of this embodiment. Thus, the load received by the bearingless motor (170) or the radial magnetic bearing (180) is higher than that in this embodiment. As a result, the efficiency with which the bearingless motor (170) rotationally drives the drive shaft (130) decreases.

Variation of First Embodiment

Figure 5:
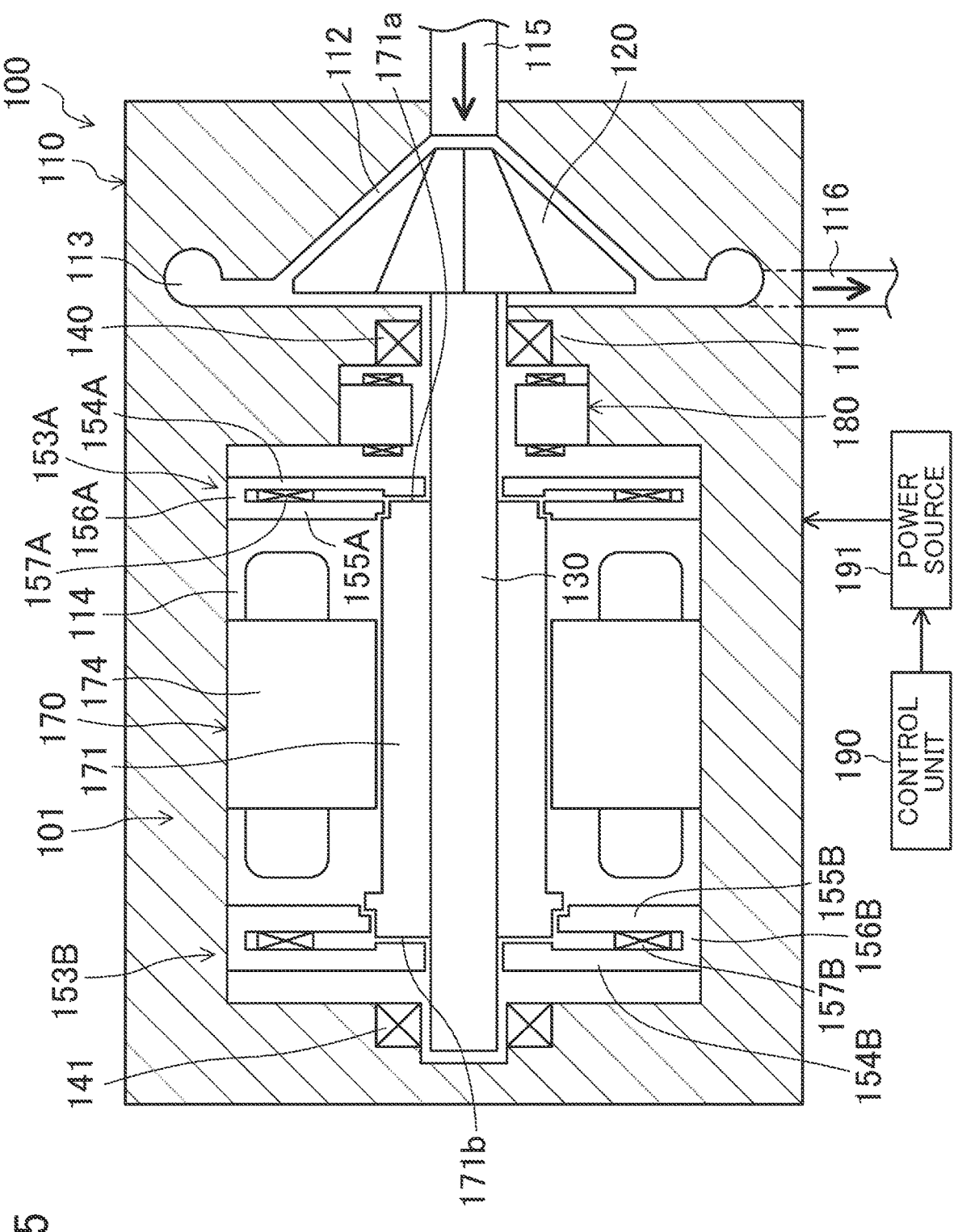
FIG. 5 is a front view illustrating example configurations of an electric motor system and a turbo compressor according to a variation of the first embodiment.

FIG. 5 is a front view illustrating example configurations of an electric motor system (101) and a turbo compressor (100) according to a variation of the first embodiment. It should be noted that, in FIG. 5, the same reference characters are used to designate the same elements as those of the electric motor system (101) and the turbo compressor (100) in the first embodiment illustrated in FIG. 1.

The electric motor system (101) and the turbo compressor (100) of this variation illustrated in FIG. 5 are distinct from those of the first embodiment in that first and second thrust magnetic bearings (153A) and (153B) are provided as the thrust magnetic bearing. The first thrust magnetic bearing (153A) is disposed closer to the radial magnetic bearing (180) as viewed from the bearingless motor (170), more specifically, disposed between the bearingless motor (170) and the radial magnetic bearing (180). The second thrust magnetic bearing (153B) is disposed opposite to the radial magnetic bearing (180) as viewed from the bearingless motor (170), more specifically, disposed on the other end portion of the drive shaft (130) (an end portion farther from the one end portion to which the impeller (120) is fixed).

Each of the first and second thrust magnetic bearings (153A) and (153B) is configured to apply a magnetic force to the drive shaft (130) in one of the axial directions. Specifically, the first thrust magnetic bearing (153A) applies a magnetic force to the drive shaft (130) in a first direction from the second thrust magnetic bearing (153B) toward the first thrust magnetic bearing (153A) (i.e., the first direction from the bearingless motor (170) toward the radial magnetic bearing (180)). The second thrust magnetic bearing (153B) applies a magnetic force to the drive shaft (130) in a second direction from the first thrust magnetic bearing (153A) toward the second thrust magnetic bearing (153B) (i.e., the second direction from the radial magnetic bearing (180) toward the bearingless motor (170)).

In this variation, the refrigerant force from the impeller (120) causes greater external force to act averagely on the rotating drive shaft (130) in the first direction than in the second direction. Thus, the magnetic force that can be applied to the drive shaft (130) by the second thrust magnetic bearing (153B) is set to be greater than the magnetic force that can be applied to the drive shaft (130) by the first thrust magnetic bearing (153A).

The first and second thrust magnetic bearings (153A) and (153B) are configured where the drive shaft (130) is provided without a thrust disk (disk portion (131)) similar to that of the first embodiment. Specifically, the first and second thrust magnetic bearings (153A) and (153B) each apply a magnetic force to an axial side surface of a corresponding one of step portions (171a, 171b) on both axial sides of the rotor (171) of the bearingless motor (170) in the first or second direction. Although not shown, if the drive shaft (130) includes a rotor portion facing the radial magnetic bearing (180), the step portion (171a) can be provided near the radial magnetic bearing (180) on condition that the rotor (171) has an outer diameter that is greater than that of the rotor portion.

Each of the thrust magnetic bearings (153A, 153B) of this variation is axially symmetric with respect to the axis of the drive shaft (130). Each of the thrust magnetic bearings (153A, 153B) includes an iron core portion (156A, 156B) fixed to the inner circumferential wall of the casing (110) and a coil (157A, 157B) disposed in the iron core portion (156A, 156B). The iron core portion (156A, 156B) has first and second collars (154A, 154B) and (155A, 155B) integrated together. The iron core portion (156A, 156B) may be made of a machined steel structure. Alternatively, if there is concern about core loss, the iron core portion (156A, 156B) may be made of laminated electromagnetic steel sheets or any other magnetic material, such as a dust core.

The first collar (154A, 154B) is configured as one of axial end portions of the corresponding iron core portion (156A, 156B) which is farther from the bearingless motor (170) and which projects radially inward. A radially inner surface of the first collar (154A, 154B) is a predetermined distance away from the outer circumferential surface of the drive shaft (130). A radially inner portion of the first collar (154A, 154B) has a stator magnetic pole surface spaced apart from, and facing, an axial side surface of the corresponding step portion (171a, 171b) of the rotor (171).

The second collar (155A, 155B) is configured as the other axial end portion of the corresponding iron core portion (156A, 156B) which is closer to the bearingless motor (170)

and which projects radially inward. A radially inner surface of the second collar (155A, 155B) are a predetermined distance away from the outer circumferential surface of the corresponding step portion (171a, 171b) of the rotor (171).

The coil (157A, 157B) is arranged in a ring shape in a space between the corresponding first and second collars (154A, 154B) and (155A, 155B). The coil (157A, 157B) is connected to the power source (191), and generates a magnetic flux by current passing therethrough from the power source (191). Thus, an axial electromagnetic force is generated between the axial side surface of each of the step portions (171a, 171b) of the rotor (171) and the stator magnetic pole surface of the corresponding thrust magnetic bearing (153A, 153B). The axial electromagnetic force supports the axial load received by a rotating system including the drive shaft (130).

The control unit (190) of this variation outputs various command values based on the value of the gap between the axial side surface of each step portion (171a, 171b) and the stator magnetic pole surface of the corresponding thrust magnetic bearing (153A, 153B) detected by a sensor instead of based on the value of the gap between the disk portion (131) and the thrust magnetic bearing (150) detected by a sensor in the first embodiment.

Features of Variation of First Embodiment

According to this variation, the first thrust magnetic bearing (153A) is disposed between the bearingless motor (170) and the radial magnetic bearing (180). This makes it easier to provide a sufficient bearing span between the bearingless motor (170) and the radial magnetic bearing (180) even if the size of the electric motor system (101) is reduced. Thus, the load received by the bearingless motor (170) or the radial magnetic bearing (180) can be reduced. Thus, the efficiency with which the bearingless motor (170) rotationally drives the drive shaft (130) is less decreased. In addition, while the efficiency of the electric motor system (101) is kept from decreasing, the size of the electric motor system (101) can be reduced. This can reduce the size of the turbo compressor (100) including the electric motor system (101).

According to this variation, the second thrust magnetic bearing (153B) is disposed opposite to the radial magnetic bearing (180) as viewed from the bearingless motor (170). In other words, the second thrust magnetic bearing (153B) is not disposed between the bearingless motor (170) and the radial magnetic bearing (180). Thus, the rotor assemblability is better than if both the first and second thrust magnetic bearings (153A, 153B) are disposed between the bearingless motor (170) and the radial magnetic bearing (180). For example, the radial magnetic bearing (180) and the bearingless motor (170) are typically shrink-fitted to the casing (110) to support the radial load on the drive shaft (130). In this variation, the rotor can be inserted after the radial magnetic bearing (180) and the bearingless motor (170) have been shrink-fitted. This can substantially prevent the permanent magnets in the rotor from being demagnetized. However, the structure of the first embodiment requires shrink fitting of the radial magnetic bearing (180) after the insertion of the rotor. Thus, there is a risk of demagnetizing the permanent magnets in the rotor.

According to this variation, the second thrust magnetic bearing (153B) is not disposed between the bearingless motor (170) and the radial magnetic bearing (180). Thus, the thermal expansion resulting from heat generated by the bearingless motor (170) exerts less effect upon the second thrust magnetic bearing (153B). This will be specifically described as follows. The first thrust magnetic bearing (153A) applies a magnetic force to the drive shaft (130) in the first direction from the second thrust magnetic bearing (153B) toward the first thrust magnetic bearing (153A), and the second thrust magnetic bearing (153B) applies a magnetic force to the drive shaft (130) in the second direction from the first thrust magnetic bearing (153A) toward the second thrust magnetic bearing (153B). Here, greater external force acts averagely on the rotating drive shaft (130) in the first direction than in the second direction. The magnetic force that can be applied to the drive shaft (130) by the second thrust magnetic bearing (153B) is greater than the magnetic force that can be applied to the drive shaft (130) by the first thrust magnetic bearing (153A). For this reason, a position sensor (gap sensor) is used for the second thrust magnetic bearing (153B), which is less likely to be affected by thermal expansion, such that the second thrust magnetic bearing (153B) is controlled with the gap length placed under control, whereas the first thrust magnetic bearing (153A) is controlled without the gap length placed under control. This enables precise control over the axial position.

According to this variation, the bearing force of the first thrust magnetic bearing (153A) (the magnetic force that can be applied to the drive shaft (130)) is small. This can make a step (the step portion (171a)) of the rotor (171) of the bearingless motor (170) smaller. This can increase the outer diameter of the rotor portion (not shown) facing the radial magnetic bearing (180). Thus, the output of the radial magnetic bearing (180) is more easily secured.

Evaluation of Bearing Loads of First Embodiment and Variation Thereof

The bearing loads of the first embodiment and the variation thereof were evaluated by simulation with respect to the bearing load observed when the first thrust magnetic bearing (153A) is disposed not between the bearingless motor (170) and the radial magnetic bearing (180) but between the radial magnetic bearing (180) and the impeller (120), in the turbo compressor (100) of the variation of the first embodiment illustrated in FIG. 5.

As a result, in the first embodiment, the bearing load on the radial magnetic bearing (180) was reduced by about 23%, and the bearing load on the bearingless motor (170) was reduced by about 41%. In the variation of the first embodiment, the bearing load on the radial magnetic bearing (180) was reduced by about 20%, and the bearing load on the bearingless motor (170) was reduced by about 29%.

In the simulation, the number and dimensions of components of the turbo compressor (100) and the weight and rotational speed of a drive system including the drive shaft (130) were all set to be unchanged.

Second Embodiment

Configurations of Turbo Compressor and Electric Motor System

Figure 6:
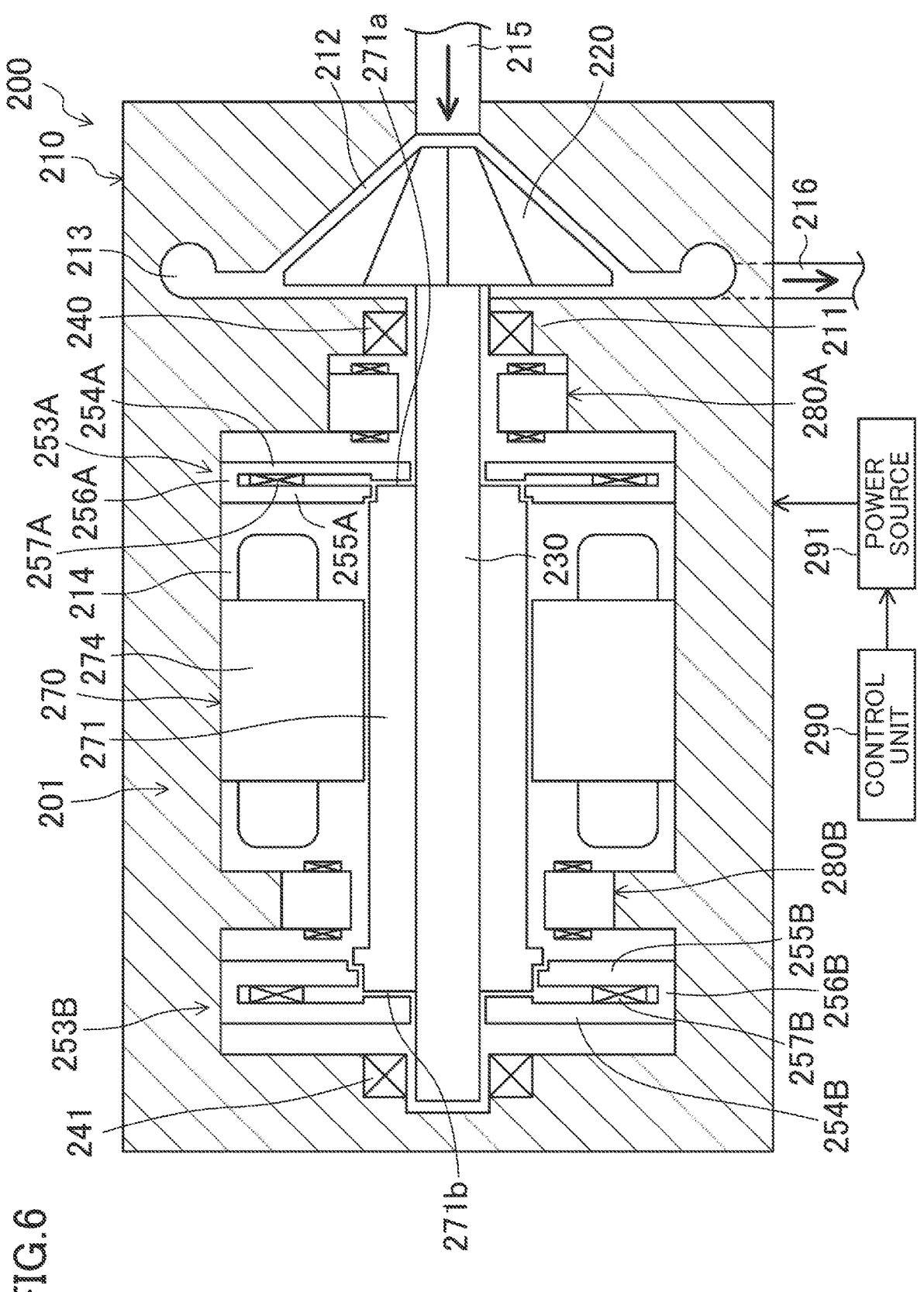
FIG. 6 is a front view illustrating example configurations of an electric motor system and a turbo compressor according to a second embodiment.

A turbo compressor (200) of this embodiment is provided in, for example, a refrigerant circuit that performs a refrigeration cycle to compress a refrigerant. As illustrated in FIG. 6, the turbo compressor (200) includes a casing (210), an impeller (220), a drive shaft (230), touchdown bearings (240, 241), first and second thrust magnetic bearings (253A, 253B), a motor (270), first and second radial magnetic bearings (280A, 280B), a control unit (290), and a power source (291). Here, the drive shaft (230), the first and second thrust magnetic bearings (253A, 253B), the motor (270), and the first and second radial magnetic bearings (280A, 280B) mainly constitute an electric motor system (201) of this embodiment. In the electric motor system (201), the impeller (220) constitutes a load. However, the type of the load on the electric motor system (201) is not limited to the impeller (220).

In this embodiment, an "axial direction" refers to a direction of an axis, i.e., a direction of an axial center of the drive shaft (230), and a "radial direction" refers to a direction orthogonal to the axial direction of the drive shaft (230). An "outer circumferential side" of a component is a side farther from the axial center of the drive shaft (230), while an "inner circumferential side" refers to a side closer to the axial center of the drive shaft (230).

In the electric motor system (201), the first radial magnetic bearing (280A) and the second radial magnetic bearing (280B) are disposed closer to the impeller (220) and opposite to the impeller (220), respectively, with respect to the motor (270) sandwiched between the first radial magnetic bearing (280A) and the second radial magnetic bearing (280B) in the axial direction of the drive shaft (230). The radial load on the drive shaft (230) is supported in a non-contact manner by the first and second radial magnetic bearings (280A, 280B). The first thrust magnetic bearing (253A) is disposed closer to the motor (270) as viewed from the second radial magnetic bearing (280B), more specifically, between the motor (270) and the first radial magnetic bearing (280A). The second thrust magnetic bearing (253B) is disposed opposite to the motor (270) as viewed from the second radial magnetic bearing (280B), more specifically, on the other end portion of the drive shaft (230) (an end portion farther from the one end portion to which the impeller (220) is fixed).

Casing

The casing (210) is formed into a cylindrical shape with its both ends closed, and is arranged such that the axis of the cylindrical shape extends horizontally. Space in the casing (210) is divided by a wall portion (211) into an impeller chamber (212) and an electric motor chamber (214). The impeller chamber (212) houses the impeller (220). The electric motor chamber (214) mainly houses the first and second thrust magnetic bearings (253A, 253B), the motor (270), and the first and second radial magnetic bearings (280A, 280B). The drive shaft (230) extends through the casing (210) in the axial direction to couple the impeller (220) and the motor (270) together. The first and second radial magnetic bearings (280A, 280B) constitute a drive support.

Impeller

The impeller (220) has a plurality of blades to have a substantially conical outer shape. The impeller (220) is housed in the impeller chamber (212) while being fixed to one end of the drive shaft (230). The impeller chamber (212) is connected to an inlet (215) and an outlet (216), and has an outer circumferential portion that forms a compression space (213). The inlet (215) is intended to guide the refrigerant from the outside into the impeller chamber (212). The outlet (216) is intended to return the high-pressure refrigerant compressed in the impeller chamber (212) to the outside. The outlet (216) is on the high-pressure side of the impeller (220), and the inlet (215) is on the low-pressure side of the impeller (220). Thus, refrigerant force proportional to the pressure differential is generated toward the inlet (215) in the axial direction. The compression space (213) is formed into a spiral shape, which may cause a pressure imbalance depending on the operating conditions. Thus, the refrigerant force is generated in the radial direction.

Touchdown Bearing

The turbo compressor (200) is provided with the two touchdown bearings (240, 241). One of the touchdown bearings (240) is provided near one end portion of the drive shaft (230) (an end portion near the impeller (220)), and the other touchdown bearing (241) is provided near the other end portion of the drive shaft (230). The touchdown bearings (240, 241) are configured to support the drive shaft (230) while the first and second radial magnetic bearings (280A) and (280B) are non-energized (i.e., while the drive shaft (230) is not levitated).

Note that, to increase the bearing span between the motor (270) and the first radial magnetic bearing (280A), the touchdown bearing (240) may be disposed between the first thrust magnetic bearing (253A) and the first radial magnetic bearing (280A).

Thrust Magnetic Bearing

Each of the first and second thrust magnetic bearings (253A) and (253B) is configured to apply a magnetic force to the drive shaft (230) in one of the axial directions. Specifically, the first thrust magnetic bearing (253A) applies a magnetic force to the drive shaft (230) in a first direction from the second thrust magnetic bearing (253B) toward the first thrust magnetic bearing (253A) (i.e., the first direction from the motor (270) toward the first radial magnetic bearing (280A)). The second thrust magnetic bearing (253B) applies a magnetic force to the drive shaft (230) in a second direction from the first thrust magnetic bearing (253A) toward the second thrust magnetic bearing (253B) (i.e., the second direction from the motor (270) toward the second radial magnetic bearing (280B)).

In this embodiment, the refrigerant force from the impeller (220) causes greater external force to act averagely on the rotating drive shaft (230) in the first direction than in the second direction. Thus, the magnetic force that can be applied to the drive shaft (230) by the second thrust magnetic bearing (253B) is set to be greater than the magnetic force that can be applied to the drive shaft (230) by the first thrust magnetic bearing (253A).

The first and second thrust magnetic bearings (253A) and (253B) are configured where the drive shaft (230) is provided without a thrust disk (disk portion (131)) similar to that of the first embodiment. Specifically, the first and second thrust magnetic bearings (253A) and (253B) each apply a magnetic force to an axial side surface of a corresponding one of step portions (271a, 271b) on both axial sides of the rotor (271) of the motor (270) in the first or second direction. Although not shown, if the drive shaft (230) includes a rotor portion facing the first radial magnetic bearing (280A), the step portion (271a) can be provided near the first radial magnetic bearing (280A) on condition that the rotor (271) has an outer diameter that is greater than that of the rotor portion.

Each of the thrust magnetic bearings (253A, 253B) of this embodiment is axially symmetric with respect to the axis of the drive shaft (230). Each of the thrust magnetic bearings (253A, 253B) includes an iron core portion (256A, 256B) fixed to the inner circumferential wall of the casing (210) and a coil (257A, 257B) disposed in the iron core portion (256A, 256B). The iron core portion (256A, 256B) has first and second collars (254A, 254B) and (255A, 255B) integrated together. The iron core portion (256A, 256B) may be made of laminated electromagnetic steel sheets. Alternatively, the iron core portion (256A, 256B) may be made of any other magnetic material, such as a dust core.

The first collar (254A, 254B) is configured as one of axial end portions of the corresponding iron core portion (256A, 256B) which is farther from the motor (270) and which projects radially inward. A radially inner surface of the first collar (254A, 254B) is a predetermined distance away from the outer circumferential surface of the drive shaft (230). A radially inner portion of the first collar (254A, 254B) has a stator magnetic pole surface spaced apart from, and facing, an axial side surface of the corresponding step portion (271a, 271b) of the rotor (271).

The second collar (255A, 255B) is configured as the other axial end portion of the corresponding iron core portion (256A, 256B) which is closer to the motor (270) and which projects radially inward. A radially inner surface of the second collar (255A, 255B) is a predetermined distance away from the outer circumferential surface of the corresponding step portion (271a, 271b) of the rotor (271).

The coil (257A, 257B) is arranged in a ring shape in a space between the corresponding first and second collars (254A, 254B) and (255A, 255B). The coil (257A, 257B) is connected to the power source (291), and generates a magnetic flux by current passing therethrough from the power source (291). Thus, an axial electromagnetic force is generated between an axial side surface of each of the step portions (271a, 271b) of the rotor (271) and the stator magnetic pole surface of the corresponding thrust magnetic bearing (253A, 253B). The axial electromagnetic force supports an axial load received by a rotating system including the drive shaft (230).

Motor

The motor (270) is configured to rotationally drive the drive shaft (230) using electromagnetic force. The motor (270) includes a rotor (271) and a stator (274). The rotor (271) is fixed to the drive shaft (230). The stator (274) is fixed to the inner circumferential wall of the casing (210). Although not shown, the rotor (271) includes a core portion and a plurality of (e.g., four) permanent magnets. The stator (274) has a back yoke, a plurality of teeth, and coils that are wound around the teeth.

Radial Magnetic Bearing

The first and second radial magnetic bearings (280A, 280B) are configured to support the radial load on the drive shaft (230) in a non-contact manner. The first and second radial magnetic bearings (280A, 280B) are fixed to the inner circumferential wall of the casing (210). The first and second radial magnetic bearings (280A, 280B) each have a configuration that is the same as, or similar to, that of the radial magnetic bearing (180) of the first embodiment illustrated in FIG. 3.

In this embodiment, the magnetic flux supporting the radial load on the drive shaft (230) is the sum of the bearing magnetic fluxes of the first and second radial magnetic bearings (280A, 280B).

In this embodiment, the first radial magnetic bearing (280A) is disposed between the motor (270) and the impeller (220). Alternatively, the first radial magnetic bearing (280A) may be disposed near one end of the drive shaft (230), and the impeller (220) may be disposed between the motor (270) and the first radial magnetic bearing (280A). However, the second radial magnetic bearing (280B) receives less bearing load if the first radial magnetic bearing (280A) is disposed between the motor (270) and the impeller (220) as in this embodiment.

In this embodiment, the first thrust magnetic bearing (253A) is disposed between the motor (270) and the first radial magnetic bearing (280A). In other words, no thrust magnetic bearing is disposed between the motor (270) and the second radial magnetic bearings (280B). This can increase the outer diameter of a rotor portion provided on a region of the drive shaft (230) facing the second radial magnetic bearing (280B). Thus, the output of the second radial magnetic bearing (280B) is more easily secured. However, alternatively, the first thrust magnetic bearing (253A) may be disposed between the motor (270) and the second radial magnetic bearing (280B). In other words, a thrust magnetic bearing does not have to be disposed between the motor (270) and the first radial magnetic bearings (280A). This can increase the outer diameter of the rotor portion provided on the region of the drive shaft (230) facing the first radial magnetic bearing (280A). Thus, the output of the first radial magnetic bearing (280A) is more easily secured.

Control Unit

The control unit (290) outputs a command value for controlling the voltage to be supplied to each thrust magnetic bearing (253A, 253B) or a command value for controlling the voltage to be supplied to each of the motor (270) and the radial magnetic bearings (280A, 280B), based on a value detected by various sensors (not shown) and the target rotational speeds of the impeller (220) and the drive shaft (230), so that the drive shaft (230) is in an intended position. Examples of various sensors include a gap sensor capable of detecting the gap between an axial side of each step portion (271a, 271b) and the stator magnetic pole surface of the corresponding thrust magnetic bearing (253A, 253B), and a gap sensor capable of detecting the gap between the drive shaft (230) and each radial magnetic bearing (280A, 280B).

The control unit (290) may include a microcomputer (not shown) and programs for operating the microcomputer, for example.

Power Source

The power source (291) supplies a voltage to each of the thrust magnetic bearings (253A, 253B), the motor (270), and the radial magnetic bearings (280A, 280B), based on command values from the control unit (290). For example, the power source (291) may be configured as a pulse width modulation (PWM) amplifier. The power source (291) constitutes an electric circuit.

Features of Second Embodiment

The electric motor system (201) of this embodiment includes the drive shaft (230) that rotationally drives the load (220), the motor (270) disposed on the drive shaft (230), the first and second radial magnetic bearings (280A) and (280B), and the first and second thrust magnetic bearings (253A) and (253B). The first radial magnetic bearing (280A) and the second radial magnetic bearing (280B) are disposed closer to the load (220) and opposite to the load (220), respectively, with respect to the motor (270) sandwiched between the first radial magnetic bearing (280A) and the second radial magnetic bearing (280B) in the axial direction of the drive shaft (230). The first thrust magnetic bearing (253A) is disposed closer to the motor (270) as viewed from the second radial magnetic bearing (280B). The second thrust magnetic bearing (253B) is disposed opposite to the motor (270) as viewed from the second radial magnetic bearing (280B). The radial load on the drive shaft (230) is supported in a non-contact manner by the first and second radial magnetic bearings (280A, 280B).

According to this embodiment, the first thrust magnetic bearing (253A) is disposed between the first and second radial magnetic bearings (280A) and (280B). For this reason, even if the size of the electric motor system (201) is reduced, a sufficient bearing span between the first and second radial magnetic bearings (280A) and (280B) can be more easily provided. Thus, the loads received by the first and second radial magnetic bearings (280A, 280B) can be reduced. Thus, the sizes of the first and second radial magnetic bearings (280A, 280B) can be reduced, and consequently the size of the electric motor system (201) can be reduced. This can reduce the size of the turbo compressor (200) including the electric motor system (201).

Third Embodiment

Figure 7:
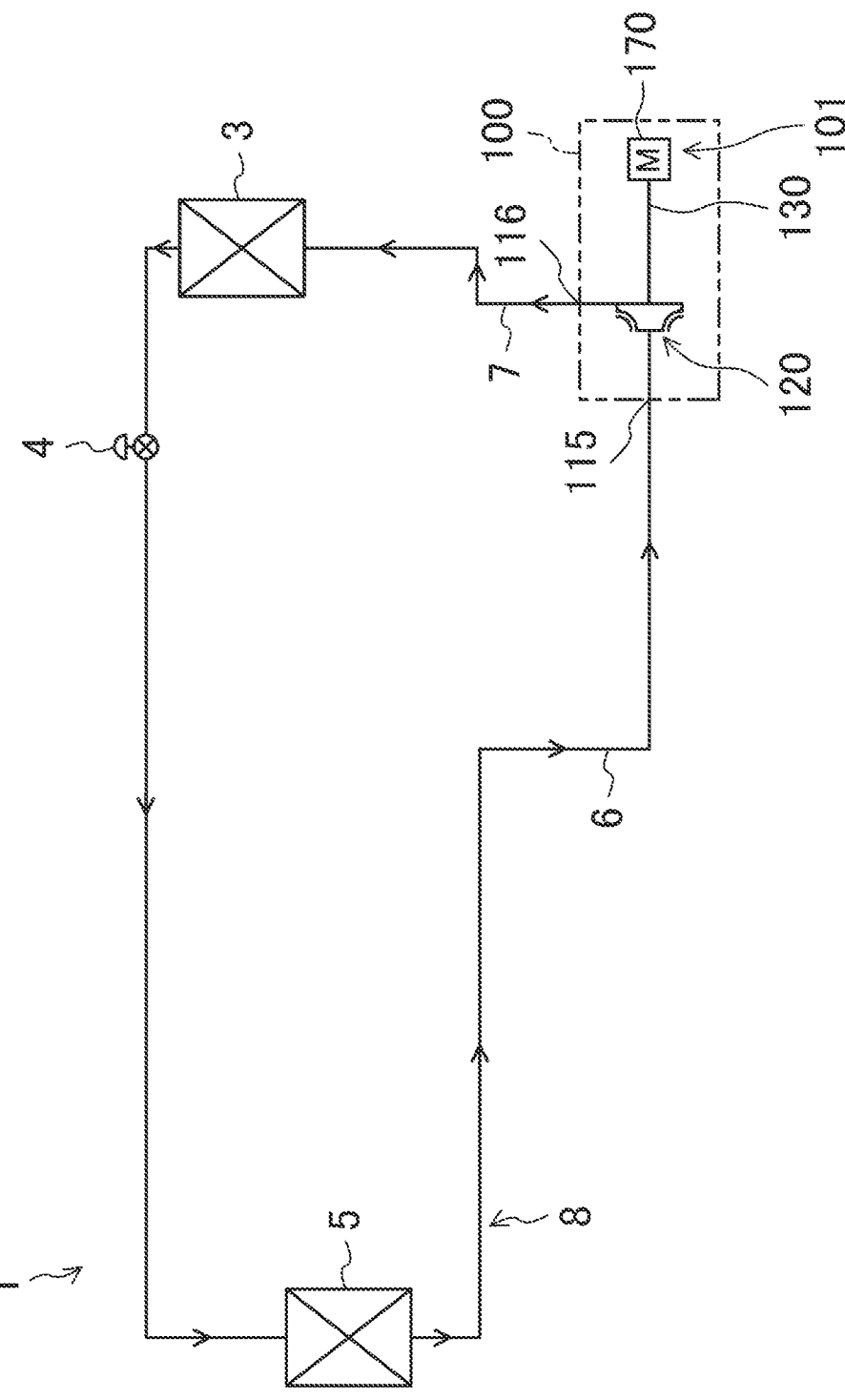
FIG. 7 is a schematic block diagram showing an air conditioner according to a third embodiment (an example of a refrigeration apparatus including the turbo compressor according to the first embodiment).

An air conditioner (1) that is an example of a refrigeration apparatus including the turbo compressor (hereinafter simply referred to as the "compressor") (100) driven by the electric motor system (101) of the first embodiment will be described with reference to FIG. 7.

The air conditioner (1) is an apparatus that conditions air in a target space through a vapor compression refrigeration cycle. The air conditioner (1) is capable of executing a cooling operation, and mainly includes the compressor (100), a heat-source-side heat exchanger (3), an expansion mechanism (4), and a utilization-side heat exchanger (5).

The compressor (100) sucks a low-pressure refrigerant flowing through a suction pipe (6) via an inlet (115) thereinto, compresses the refrigerant sucked via the inlet (115) to high pressure, and then discharges the resultant high-pressure refrigerant to a discharge pipe (7) via an outlet (116). The suction pipe (6) is a refrigerant pipe through which the refrigerant flowing out of the utilization-side heat exchanger (5) is guided to the suction side (inlet (115)) of the compressor (100). The discharge pipe (7) is a refrigerant pipe through which the refrigerant discharged from the compressor (100) via the outlet (116) is guided to an entrance to the heat-source-side heat exchanger (3).

As described in the first embodiment, the compressor (100) mainly includes the bearingless motor (170), the drive shaft (130), and the impeller (120). The driving force of the bearingless motor (170) is transmitted from the drive shaft (130) to the impeller (120), and thus the impeller (120) rotates around the drive shaft (130). Thus, the compressor (100) compresses the sucked refrigerant flowing thereinto via the inlet (115).

The heat-source-side heat exchanger (3) functions as a refrigerant radiator that radiates heat from the refrigerant discharged from the compressor (100) by exchanging heat between the refrigerant and water or air serving as a cooling source. One end of the heat-source-side heat exchanger (3) is connected to the outlet (116) of the compressor (100) via the discharge pipe (7). The other end of the heat-source-side heat exchanger (3) is connected to the expansion mechanism (4).

The expansion mechanism (4) is a mechanism for reducing the pressure of the refrigerant that has radiated heat in the heat-source-side heat exchanger (3), and is configured as, for example, an electric expansion valve. One end of the expansion mechanism (4) is connected to the heat-source-side heat exchanger (3). The other end of the expansion mechanism (4) is connected to the utilization-side heat exchanger (5).

The utilization-side heat exchanger (5) functions as a refrigerant heater that heats the refrigerant that has had its pressure reduced in the expansion mechanism (4) by exchanging heat between the refrigerant and water or air serving as a heating source. One end of the utilization-side heat exchanger (5) is connected to the expansion mechanism (4). The other end of the utilization-side heat exchanger (5) is connected to the inlet (115) of the compressor (100) via the suction pipe (6).

As can be seen from the foregoing description, in the air conditioner (1), the compressor (100), the heat-source-side heat exchanger (3), the expansion mechanism (4), and the utilization-side heat exchanger (5) are sequentially connected together through refrigerant pipes including the suction pipe (6) and the discharge pipe (7) to form a path (8) through which the refrigerant circulates.

According to the refrigeration apparatus (air conditioner (1)) of this embodiment, the compressor (100) driven by the electric motor system (101) of the first embodiment is used. This can reduce the size of the refrigeration apparatus.

This embodiment illustrates a case where the compressor (100) and the electric motor system (101) of the first embodiment are used as a compressor and an electric motor system. However, also if, alternatively, the compressor (100) and the electric motor system (101) of the variation of the first embodiment, or the compressor (200) and the electric motor system (201) of the second embodiment are used as a compressor and an electric motor system, respectively, the advantages similar to those of this embodiment can be provided.

Other Embodiments

In each of the foregoing embodiments (including the variations; the same shall apply hereinafter), the electric motor system (101, 201) and the turbo compressor (100, 200) including a single-stage impeller (120, 220) as a load have been described. Alternatively, an electric motor system and a turbo compressor may be configured to have one end provided with multi-stage impellers as a load.

While the embodiments have been described above, it will be understood that various changes in form and details can be made without departing from the spirit and scope of the claims. The above embodiment may be combined or replaced as appropriate as long as the functions of the target of the present disclosure are not impaired. The expressions of "first," "second," . . . described above are used to distinguish the terms to which these expressions are given, and do not limit the number and order of the terms.

As can be seen from the foregoing description, the present disclosure is useful for an electric motor system, a turbo compressor, and a refrigeration apparatus.

The invention claimed is:

1. An electric motor system comprising:
a drive shaft configured to rotationally drive a load; and
a bearingless motor and a radial magnetic bearing arranged side by side in an axial direction of the drive shaft,
a radial load on the drive shaft being supported in a non-contact manner by the bearingless motor and the radial magnetic bearing;
the radial magnetic bearing being disposed between the bearingless motor and the load,
a thrust magnetic bearing disposed between the bearingless motor and the radial magnetic bearing,
no other radial magnetic bearing being disposed opposite to the radial magnetic bearing as viewed from the bearingless motor.

2. The electric motor system of claim 1, wherein
the thrust magnetic bearing is a first thrust magnetic bearing disposed closer to the radial magnetic bearing as viewed from the bearingless motor; and the electric motor system further comprises a second thrust magnetic bearing disposed opposite to the radial magnetic bearing as viewed from the bearingless motor,
the first thrust magnetic bearing being disposed between the bearingless motor and the radial magnetic bearing.

3. The electric motor system of claim 2, wherein
the first thrust magnetic bearing applies a magnetic force to the drive shaft in a first direction from the second thrust magnetic bearing toward the first thrust magnetic bearing,
the second thrust magnetic bearing applies a magnetic force to the drive shaft in a second direction from the first thrust magnetic bearing toward the second thrust magnetic bearing,
when the drive shaft is rotating, a greater external force acts averagely on the drive shaft in the first direction than in the second direction, and
a magnetic force that can be applied to the drive shaft by the second thrust magnetic bearing is greater than a magnetic force that can be applied to the drive shaft by the first thrust magnetic bearing.

4. The electric motor system of claim 3, wherein
the radial magnetic bearing is disposed between the bearingless motor and the load.

5. A turbo compressor including the electric motor system of claim 3, wherein
the load is an impeller.

6. The electric motor system of claim 2, wherein
the radial magnetic bearing is disposed between the bearingless motor and the load.

7. A turbo compressor including the electric motor system of claim 2, wherein
the load is an impeller.

8. The electric motor system of claim 1, wherein
the radial magnetic bearing is disposed between the bearingless motor and the load.

9. A turbo compressor including the electric motor system of claim 8, wherein
the load is an impeller.

10. A turbo compressor including the electric motor system of claim 1, wherein
the load is an impeller.

11. A refrigeration apparatus including the turbo compressor of claim 10.

12. An electric motor system comprising:
a drive shaft configured to rotationally drive a load; and
a motor disposed on the drive shaft;
a first radial magnetic bearing and a second radial magnetic bearing disposed closer to the load and opposite to the load, respectively, with respect to the motor sandwiched between the first radial magnetic bearing and the second radial magnetic bearing along an axial direction of the drive shaft;
a first thrust magnetic bearing disposed closer to the motor as viewed from the second radial magnetic bearing; and
a second thrust magnetic bearing disposed opposite to the motor as viewed from the second radial magnetic bearing,
a radial load on the drive shaft being supported in a non-contact manner by the first and second radial magnetic bearings,
the first radial magnetic bearing being disposed between the load and the motor, and only the first thrust magnetic bearing being disposed, as a thrust magnetic bearing between the first and second radial magnetic bearings.

13. The electric motor system of claim 12, wherein the first thrust magnetic bearing is disposed between the motor and the first radial magnetic bearing.

14. A turbo compressor including the electric motor system of claim 13, wherein the load is an impeller.

15. A turbo compressor including the electric motor system of claim 12, wherein the load is an impeller.

16. A refrigeration apparatus including the turbo compressor of claim 15.

\* \* \* \* \*